United States Patent
Johnson et al.

(10) Patent No.: US 8,015,035 B1
(45) Date of Patent: Sep. 6, 2011

(54) SYSTEM AND METHOD FOR ESTABLISHING RATES FOR A PROPERTY INSURANCE POLICY

(75) Inventors: Jerromy Laverne Johnson, San Antonio, TX (US); Deborah Murphy, San Antonio, TX (US); Mark Allen Garrett, Bulverde, TX (US); Beverly Lynn Phillips, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 1802 days.

(21) Appl. No.: 10/649,252

(22) Filed: Aug. 26, 2003

Related U.S. Application Data

(60) Provisional application No. 60/406,248, filed on Aug. 27, 2002.

(51) Int. Cl.
*G06Q 10/00* (2006.01)
*G06Q 50/00* (2006.01)
*G06Q 40/00* (2006.01)
*A61B 5/00* (2006.01)
*G06F 19/00* (2011.01)

(52) U.S. Cl. .................................... 705/4; 705/2; 705/3
(58) Field of Classification Search ............... 705/1, 2–4
See application file for complete search history.

(56) References Cited

U.S. PATENT DOCUMENTS

| | | | | |
|---|---|---|---|---|
| 4,831,526 | A * | 5/1989 | Luchs et al. | 705/4 |
| 5,231,571 | A * | 7/1993 | D'Agostino | 705/36 R |
| 5,991,733 | A * | 11/1999 | Aleia et al. | 705/8 |
| 6,186,793 | B1 * | 2/2001 | Brubaker | 434/107 |
| 6,584,446 | B1 * | 6/2003 | Buchanan et al. | 705/4 |
| 2001/0023404 | A1 * | 9/2001 | Ogawa et al. | 705/4 |
| 2002/0055862 | A1 * | 5/2002 | Jinks | 705/4 |

OTHER PUBLICATIONS http://web.archive.org/web/20020124085629/http://www.choicepoint.net/ Dated: Jan. 24, 2002.*
ChoicePoint, Jan. 24, 2002, [online], Retrieved from web.archive.org using the Internet <URL: http://web.archive.org/web/20020124085629/http://www.choicepoint.net/>.*

* cited by examiner

*Primary Examiner* — Jason B Dunham
*Assistant Examiner* — Amber Altschul
(74) *Attorney, Agent, or Firm* — Kilpatrick Townsend & Stockton LLP

(57) ABSTRACT

Property insurance rates are established by performing calculations for defining a single tier placement dependent upon a combination of mutually exclusive factors based on applicant data. In the case of a renewal policy, the factors include determining a protection class and a previous paid loss history. In the case of a new policy, the factors also include determining an insurance credit score. No single factor is the sole determinant for placement in a tier.

21 Claims, 2 Drawing Sheets

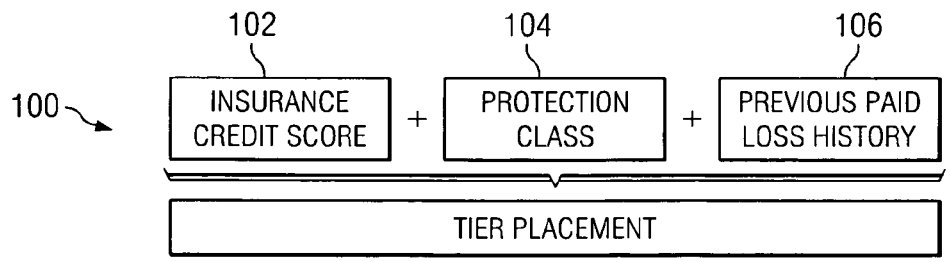
Fig. 1
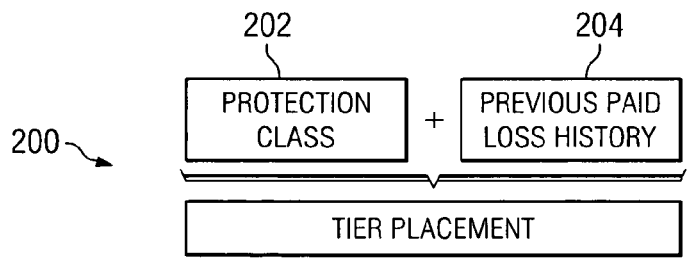
Fig. 2
| INSURANCE CREDIT SCORE | APPLICABLE RANGE | |
|---|---|---|
| 762-997 | RANGE 1 | 302 |
| 631-761, NOT SCORED, NO HIT | RANGE 2 | 304 |
| 200-630 | RANGE 3 | 306 |
Fig. 3
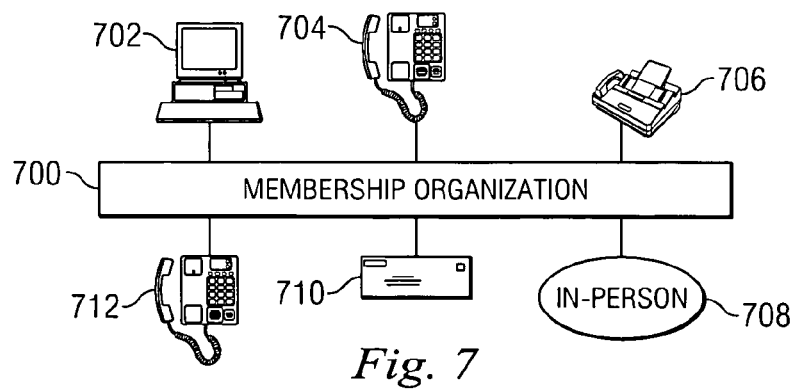
Fig. 7

| | INSURANCE CREDIT SCORE* | PROTECTION CLASS | PRIOR LOSSES | |
|---|---|---|---|---|
| TIER 2 | RANGE 1 | 1-9 | 0 TO 1 | |
| | RANGE 1 | 10 | 0 | |
| | RANGE 2 | 1-9 | 0 | 402 |
| TIER 3 | RANGE 1 | 1-9 | 2 | |
| | RANGE 1 | 10 | 1 | 404 |
| | RANGE 2 | 1-9 | 1 | |
| | RANGE 2 | 10 | 0 TO 1 | |
| | RANGE 3 | 1-9 | 0 | |
| TIER 4 | RANGE 1 | 1-9 | 3 OR MORE | |
| | RANGE 1 | 10 | 2 OR MORE | |
| | RANGE 2 | 1-9 | 2 OR MORE | |
| | RANGE 2 | 10 | 2 OR MORE | |
| | RANGE 3 | 1-9 | 1 OR MORE | |
| | RANGE 3 | 10 | 0 OR MORE | 406 |

| | PROTECTION CLASS | PRIOR LOSSES | |
|---|---|---|---|
| TIER 2 | 1-9 | 0 TO 1 | 502 |
| | 10 | 0 | |
| TIER 3 | 1-9 | 2 | 504 |
| | 10 | 1 | |
| TIER 4 | 1-9 | 3 OR MORE | 506 |
| | 10 | 2 OR MORE | |

SYSTEM AND METHOD FOR ESTABLISHING RATES FOR A PROPERTY INSURANCE POLICY

This application claims priority to U.S. Application Ser. No. 60/406,248 filed Aug. 27, 2002, entitled HOMEOWNER RISK SEGMENTATION AND DEDUCTIBLE INFRASTRUCTURE, which is incorporated herein by reference in its entirety.

BACKGROUND

The disclosures herein relate generally to establishing insurance rates for customers of a company, and more particularly to a system and method for establishing rates for a property insurance policy.

Establishing criteria for setting insurance rates is very complex and requires the consideration of a number of factors. Various combinations of factors have been considered in the past. It is important that the factors used are able to produce reliable results and consistent results. With respect to property insurance, a residence, for example, may include contents and/or or structure such as for example, an owned or rented single dwelling, condo or apartment.

Therefore, what is needed is a combination of factors that are consistently reliable in establishing fair rates for property insurance for both new and renewal coverage.

SUMMARY

One embodiment, accordingly, provides for establishing rates for a property insurance policy. To this end, calculations are performed for establishing a single tier placement dependent upon a combination of mutually exclusive risk factors based on applicant data. The factors include determining a protection class, and determining a previous paid loss history.

Advantageously, no single risk characteristic is the sole determinant for placement in a tier because a unique combination of the factors determine tier placement.

BRIEF DESCRIPTION OF THE DRAWINGS

FIG. 1 is a chart illustrating an embodiment of factors considered for a new policy tier placement.

FIG. 2 is a chart illustrating an embodiment of factors considered for a renewal policy tier placement.

FIG. 3 is a chart illustrating ranges of an insurance credit score.

FIG. 7 is a schematic view illustrating various modes of communication with a membership organization for insurance coverage.

DETAILED DESCRIPTION

Figures 4, 5, 6:
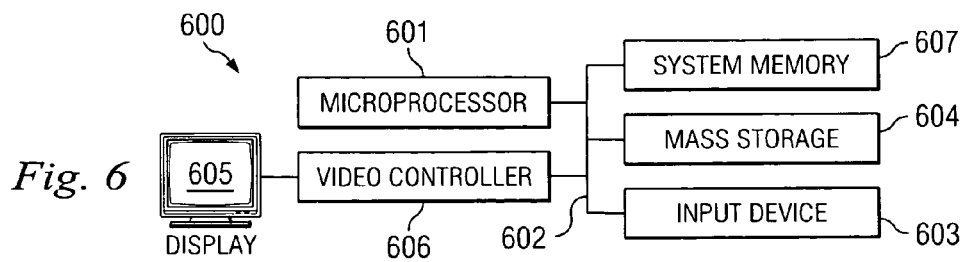
FIG. 4 is a chart illustrating tier placement for a new policy.
FIG. 5 is a chart illustrating tier placement for a renewal policy.
FIG. 6 is a schematic view illustrating an embodiment of a computer system for use in analyzing a member profile and providing a tier placement.

Referring now to FIG. 1, it is illustrated in a chart designated 100, that tier placement considers factors for a new policy including an insurance credit score factor at 102, a protection class factor at 104 and a previous paid loss history factor at 106.

Referring to FIG. 2, it is illustrated in a chart designated 200, that tier placement considers factors for a renewal policy including a protection class factor at 202 and a previous paid loss history factor at 204.

The insurance credit score factor at 102 is used to measure the insured's degree of responsibility. This factor is determined by using the commercially available ChoicePoint Attract™ standard auto model. The insurance credit score is a three-digit number based on a credit report from an appropriate national bureau. The report is scanned for such information as the number of open trade accounts, e.g. loans, charge cards, the payment record, i.e., late payments, the number of existing or past liens, the number of bankruptcy filings, etc. This factor is considered an indicator of the likelihood of an insured party to file a claim or have a loss in the near future. The insurance credit score factor is not an underwriting factor for renewal business (discussed below) after the first renewal, and will not be ordered reviewed on existing business.

An example of the three-digit number for the insurance credit score factor is illustrated in FIG. 3, at chart 300, and divides the scores into ranges. For example, a score of 762-997 at 302 is the best score and is defined as Range 1. A mid-range score of 631-761 at 304 is defined as Range 2. A score of 200-630 at 306 is the worst score and is defined as Range 3.

The protection class factor at 104 includes an assigned number of from 1 (best) to 10 (worst). This number is provided by The Insurance Services Organization (ISO) on a nationally available rating table. The assigned number is the result of a study of fire stations and their ability to quickly respond to an alarm, the equipment used, the water carrying and pumping capability of that equipment, the proximity of hydrants, the fire personnel training, and whether those personnel are full time or volunteers. Another factor is the proximity of the insured's or applicant's residence to the applicable fire stations.

The previous paid loss history at 106 includes a study for the period dating back three years prior to the beginning of a new or renewal policy. This history is established using one or more of three methods. The first method is where the insured (or applicant) provides the information. The second method is where the insurer possesses the loss history such as in the case of a renewal. The third method is where the information is provided by a third party such as a commercially available service. One such service is the ChoicePoint Comprehensive Loss Underwriting Exchange (CLUE) data file. The previous paid loss history is represented by a number which corresponds to the number of all paid losses within the above-mentioned three year period.

The factors 102, 104 and 106 are used to determine tier placement at original issue through the first annual renewal. All factors are mutually exclusive and every policy will fall into one, and only one, rating tier based on the unique characteristics of each risk and the combination of these characteristics.

Thus, for a new policy, a tier of 2, 3 or 4, where 2 is best and 4 is worst, will emerge from a table designated 400, FIG. 4, which considers the insurance credit score from Ranges 1-3, the protection class ranges of from 1 to 10, and the actual number of prior losses of from zero to three or more.

For example, at line 402, a new policy applicant having an insurance credit score which falls within Range 2, a protection class number of from 1 to 9, and no prior losses, falls into tier 2 of table 400, and may therefore receive a preferred rate quote.

Also, for a new policy, at line 404, an applicant having an insurance credit score which falls within Range 1, a protection class number of 10 and 1 prior loss, falls into tier 3 of table 400, and may therefore receive a standard rate quote.

Further, for a new policy, at line 406, an applicant having an insurance credit score which falls within Range 3, a protection class number of 10 and zero or more prior loss(es), falls into tier 4 of table 400, and may therefore receive a non-standard rate quote.

For a renewal policy, a tier of 2, 3 or 4 will emerge from a table designated 500, FIG. 5, which considers no insurance credit score ranges, but considers the protection class ranges of from 1 to 10, and also the actual number of prior losses of from zero to three or more.

For example, at line 502, an insured renewal having a protection class number of 10 and no prior losses, places the insured in tier 2, which qualifies for a preferred rate quote.

Also, for a renewal, at line 504, an insured having a protection class number of from 1 to 9 and 2 prior losses, places the insured in tier 3, which qualifies for a standard rate quote.

Further, for a renewal, at line 506, an insured having a protection class number of from 1 to 9 and 3 or more prior losses, places the insured in tier 4, which qualifies for a non-standard rate quote.

In addition, these renewal factors (202 and 204) will be used to determine tier placement at the second and subsequent annual renewal following original issue. Risk will only move the insured from their current tier to a higher (i.e. 2-3 or 3-4) rated tier at renewal when they fall within the listed ranges for that tier and have a paid loss in the last 15 months.

In one embodiment, a computer system 600, FIG. 6, may be used to establish a tier placement on tables 400 and 500. The computer system 600 includes a microprocessor 601, which is connected to a bus 602. Bus 602 serves as a connection between microprocessor 601 and other components of computer system 600. An input device 603 is coupled to microprocessor 601 to provide input to microprocessor 601. Examples of input devices include keyboards, touchscreens, and pointing devices such as mouses, trackballs and trackpads. Programs and data are stored on a mass storage device 604, which is coupled to microprocessor 601 for establishing a single tier placement as described herein. Mass storage devices include such devices as hard disks, optical disks, magneto-optical drives, floppy drives and the like. Computer system 600 further includes a display 605, which is coupled to microprocessor 601 by a video controller 606. A system memory 607 is coupled to microprocessor 601 to provide the microprocessor with fast storage to facilitate execution of computer programs by microprocessor 601. It should be understood that other busses and intermediate circuits can be deployed between the components described above and microprocessor 601 to facilitate interconnection between the components and the microprocessor.

Such insurance coverage, discussed above, may be offered by a membership organization 700, FIG. 7, for the benefit of members. A member may access the organization for rates by several modes of communication including, but not limited to, Internet or Intranet 702, phone 704, fax 706, in-person 708, mail 710 or wireless 712.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A apparatus for establishing rates for a property insurance policy, comprising a computer-readable medium encoded with a computer program that, when executed:
   determines a single tier placement for an applicant dependent upon a combination of mutually exclusive factors based on a plurality of data about the applicant, such that no single risk characteristic is the sole determinant for placement in a tier, the factors including:
   a) a protection class; and
   b) a previous paid loss history; and
   establishes a rate quote for a property insurance policy of a single insurance company for the applicant based on the tier placement of the applicant, wherein the tier placement results in one of a preferred rate quote, a standard rate quote, and a non-standard rate quote.

2. The apparatus as defined in claim 1 wherein the policy is a renewal policy.

3. The apparatus as defined in claim 2 wherein the protection class is one of a plurality of nationally published numbers.

4. The apparatus as defined in claim 3 wherein the nationally published numbers are in a range of from 1 to 10.

5. The apparatus as defined in claim 2 wherein the previous paid loss history establishes one number in a range of from 0 losses to 3 or more losses paid in a previous three year period.

6. The apparatus as defined in claim 1 wherein the previous paid loss history is established based on one or more of information provided by an applicant, information provided by an insurer, and information provided by a third party.

7. The apparatus as defined in claim 1 wherein the factors used for determining a single tier placement for the applicant further comprise an insurance credit score.

8. The apparatus as defined in claim 7 wherein the policy is a new policy.

9. The apparatus as defined in claim 7 wherein the insurance credit score is derived from a nationally used credit model.

10. The apparatus as defined in claim 9 wherein the insurance credit score is a three digit number which falls into one of a set of multiple ranges.

11. The apparatus as defined in claim 7 wherein the protection class is one of a plurality of nationally published numbers.

12. The apparatus as defined in claim 11 wherein the nationally published numbers are in a range of from 1 to 10.

13. The apparatus as defined in claim 7 wherein the previous paid loss history establishes one number in a range of from 0 losses to 3 or more losses paid in a previous three year period.

14. An apparatus for establishing rates for a property insurance policy, the apparatus comprising:
   a computer system for determining a single tier placement for an applicant dependent upon a combination of mutually exclusive factors based on a plurality of data about the applicant, the computer system including:
   a storage device storing a program; and
   a processor coupled to the storage device, the processor operative with the program for establishing a rate quote for a property insurance policy of a single insurance company for the applicant based on the tier placement of the applicant in response to determining a protection class factor and a previous paid loss history factor, wherein the tier placement results in one of a preferred rate quote, a standard rate quote, and a non-standard rate quote.

15. The apparatus as defined in claim 14 wherein the processor is operative with the program to establish a rate quote for the property insurance policy for the applicant based on the tier placement of the applicant in response to further determining an insurance credit score factor.

16. The apparatus as defined in claim 14 wherein the policy is a renewal policy.

17. The apparatus as defined in claim 15 wherein the policy is a new policy.

18. An method apparatus for establishing rates for a property insurance policy comprising a computer-readable medium encoded with a computer program that, when executed:

an applicant communicates a request for property insurance;

in response to the request, uses a computer system for determining a single tier placement for the applicant dependent upon a combination of mutually exclusive factors based on a plurality of data provided by the applicant, the factors including:
 a) a protection class; and;
 b) a previous paid loss history; and establishes a rate quote for a property insurance policy of a single membership organization for the applicant based on the tier placement of the applicant, wherein the tier placement results in one of a preferred rate quote, a standard rate quote, and a non-standard rate quote.

19. The apparatus as defined in claim 18 wherein the policy is a renewal policy.

20. The apparatus as defined in claim 18 wherein the factors used for determining a single tier placement for the applicant further include:

an insurance credit score.

21. The apparatus as defined in claim 20 wherein the policy is a new policy.

\* \* \* \* \*